July 29, 1924.
J. M. ALLEN
1,502,933
AUTO LOCK
Filed Aug. 22, 1923
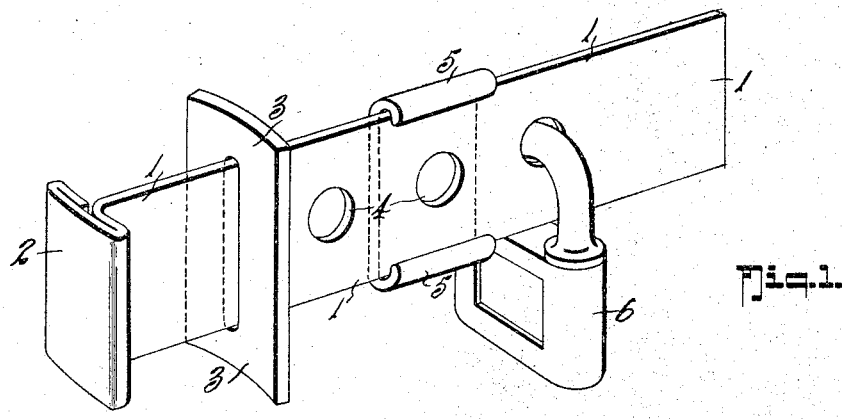
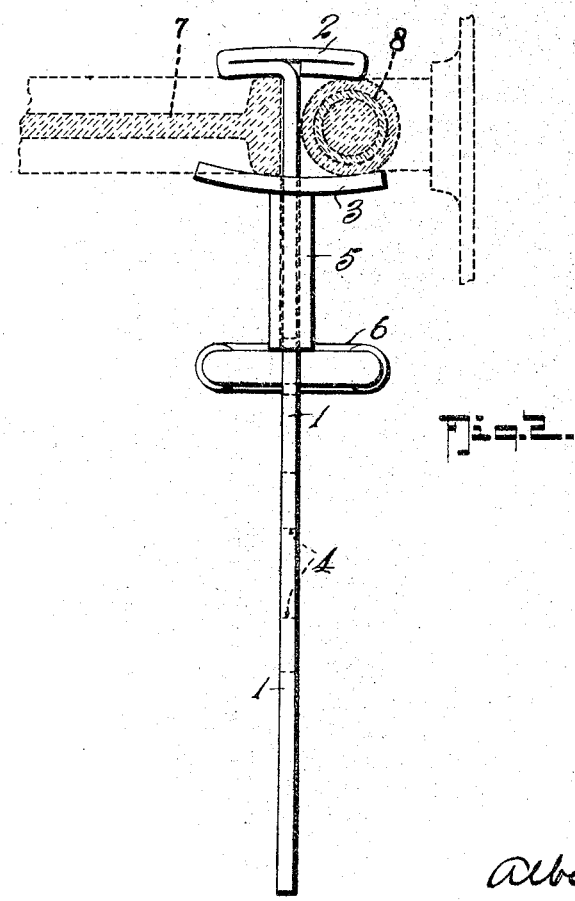
INVENTOR
John M. Allen.
BY
Albert E. Dietrich
ATTORNEY Patented July 29, 1924.

1,502,933

UNITED STATES PATENT OFFICE.

JOHN M. ALLEN, OF ST. JOHNSBURY, VERMONT.

AUTO LOCK.

Application filed August 22, 1923. Serial No. 658,818.

*To all whom it may concern:*

Be it known that I, JOHN M. ALLEN, a citizen of the United States, and resident of St. Johnsbury, county of Caledonia, and State of Vermont, have invented a new and useful Auto Lock, of which the following is a specification.

My invention has for its object to provide a simple, inexpensive device for use in locking automobiles against theft and it comprises a T-plate adapted to be inserted between the front axle fork and the spindle on which the front wheel is mounted, the T-plate being provided with a slidable head-plate on the shank of the T-plate and a member slidable along the shank to hold the head-plate against the spindle and axle, the T-plate shank having a series of holes to receive a pad lock for the purpose of locking the parts of the device in place and thereby prevent turning of the wheels.

More specifically, the invention includes those novel details of construction, combination and arrangement of parts, all of which will be first fully described, then be specifically pointed out in the appended claims, and illustrated in the accompanying drawing, in which:

Figure 1 is a perspective view of my device.

Figure 2 is a plan view of the same, showing in dotted lines, its association with the automobile axle and spindle.

In the drawing, in which like numerals and letters of reference indicate like parts in all of the figures, 1 is the shank and 2 the head of the T-plate, the head 2 being made wide enough to lap over the axle 7 and the spindle 8 sufficiently to prevent the spindle being turned; the shank is made to fit between the spindle and the axle, as shown in Figure 2 of the drawing.

3 represents a head-plate which is slotted to fit slidably on the shank 1 and cooperate with the head 2 as a clamp to engage the spindle and axle, the head-plate 3 being of a width necessary to hold the spindle against turning.

The head 2 and the head-plate 3 may be shaped, if desired, to conform to the cross section of the axle and spindle surfaces against which they lie when locked together.

In order to permit the device being fitted to different makes of cars, the shank 1 has a series of holes for receiving the loop of the pad lock 6 and in order that the pad lock need not be brought too close to the head-plate (thereby making it easier to manipulate the same) and in order to hold the head-plate and head tightly against the axle and spindle, I provide a slide or collar 5 movable on the shank to abut the head-plate and be itself engaged by the loop of the pad lock when passed through an adjacent hole of the shank.

While there are a great many different shapes of front axle forks, in order to adapt my invention to different types of axle forks it is simply necessary to change the width of the plate number 3 and the end 2 of the bar to meet the requirements of nearly every car on the market; the holes 4 will be drilled in the bar and the piece 4 will be located differently for different makes of cars so as to bring all parts snugly up to the axle and avoid looseness after the pad-lock has been applied.

When the device is operatively applied, as illustrated diagrammatically in Figure 2 of the drawing, the head 2 and the head-plate 3 will project at one side to engage the axle 7 to hold the device against movement, and at the other side to abut the opposite sides of the extension of the spindle 8 to prevent free steering movement thereof.

From the foregoing description, taken in connection with the accompanying drawing, it is thought the complete construction and advantages of the invention will be clear to those skilled in the art. It will be noticed that by my construction the device can be made of plain strap iron or bar and the parts formed and fitted together at minimum expense. The parts can be made heavy enough to serve the intended purposes and render it difficult for a thief to tamper with the same for the purposes of releasing the machine.

What I claim is:

1. A device of the class described comprising a T-plate having a head and a shank, a head-plate slidable on the shank, a slide on the shank to abut the head-plate, said shank having apertures to receive a pad lock.

2. A device of the class described, a flat shank having a head and adapted to fit between the axle fork and spindle of an automobile, a head-plate slidable on said shank, said head and said head-plate being adapted to clamp the axle and spindle between them, a slide on the shank, and a pad lock for holding the slide against the head-plate and the head and head-plate in their clamping position, substantially as shown and described.

3. A device of the class described comprising a T-plate, a head-plate slidable on said T-plate, and means for locking said head-plate in position thereon.

4. A device of the class described comprising a T-plate having a head and shank, a head-plate slidable on the shank, and locking means for said head-plate.

5. A device of the class described comprising a flat shank having a head and adapted to fit between the axle fork and spindle of an automobile, and a head-plate slidable on said shank and adapted to be locked in position on the shank.

JOHN M. ALLEN.